United States Patent [19]

Olodort et al.

[11] Patent Number: 4,875,174

[45] Date of Patent: Oct. 17, 1989

[54] INSTANT LABEL PRINTER FOR HOST COMPUTER

[75] Inventors: Robert Olodort, Los Angeles; Charles Micalizzi, Capistrano Beach; Louis Cambruzzi, Placentia; Randy Turchik, Laguna Hills, all of Calif.

[73] Assignee: Print Things, Santa Monica, Calif.

[21] Appl. No.: 23,075

[22] Filed: Mar. 6, 1987

[51] Int. Cl.⁴ .............................................. G06F 3/09
[52] U.S. Cl. ..................................... 364/519; 400/63; 400/83; 101/288
[58] Field of Search .................. 364/518, 519; 400/83, 400/63, 62, 67, 68, 71, 61, 70; 101/288

[56] References Cited

U.S. PATENT DOCUMENTS

| | | | |
|---|---|---|---|
| 3,940,746 | 2/1976 | Vittorelli | 400/71 |
| 4,262,591 | 4/1981 | Cook | 101/92 |
| 4,264,396 | 4/1981 | Stewart | 156/361 |
| 4,422,376 | 12/1983 | Teraoka | 156/384 |
| 4,432,830 | 2/1984 | Jue | 156/384 |
| 4,516,208 | 5/1985 | Sakura et al. | 364/466 |
| 4,519,048 | 5/1985 | Abellana et al. | 364/900 |
| 4,591,998 | 5/1986 | Kuperman et al. | 364/521 |
| 4,623,418 | 11/1986 | Gombrich et al. | 156/361 |
| 4,635,212 | 1/1987 | Hatazawa | 364/518 |
| 4,710,886 | 12/1987 | Heath | 364/519 |
| 4,712,928 | 12/1987 | Kuitaoka | 400/76 |
| 4,718,784 | 1/1988 | Drisko | 400/68 |
| 4,755,955 | 7/1988 | Kimura et al. | 364/518 |
| 4,769,648 | 9/1988 | Kishino et al. | 346/33 R |
| 4,778,288 | 10/1988 | Nakamura | 400/76 |
| 4,779,105 | 10/1988 | Thomson et al. | 346/154 |

FOREIGN PATENT DOCUMENTS 0006974 1/1982 Japan .................................. 364/519

OTHER PUBLICATIONS

IBM Technical Disclosure Bulletin, vol. 28, No. 2, Jul. 8, 1985.
Gibson Steven, "Thanks for the Memory: How TSR Software Works", Tech. Talk, Infor Word, 7/27/87.

Primary Examiner—Gary V. Harkcom
Assistant Examiner—Phu K. Nguyen
Attorney, Agent, or Firm—Lowe, Price, Leblanc, Becker & Shur

[57] ABSTRACT

By accessing the screen drivers of a host computer, a label printer provides a user of a host computer immediate printing onto a label of portions of a screen display generated by programs running on the host. A program controlling the label printer and executed by the host computer searches for and locates an address field on the screen, or data may be input to the screen by the user, to be captured for printing on a label. The data to be printed may be in alphanumeric format, graphic format, bar code format, or any combination of them.

10 Claims, 7 Drawing Sheets

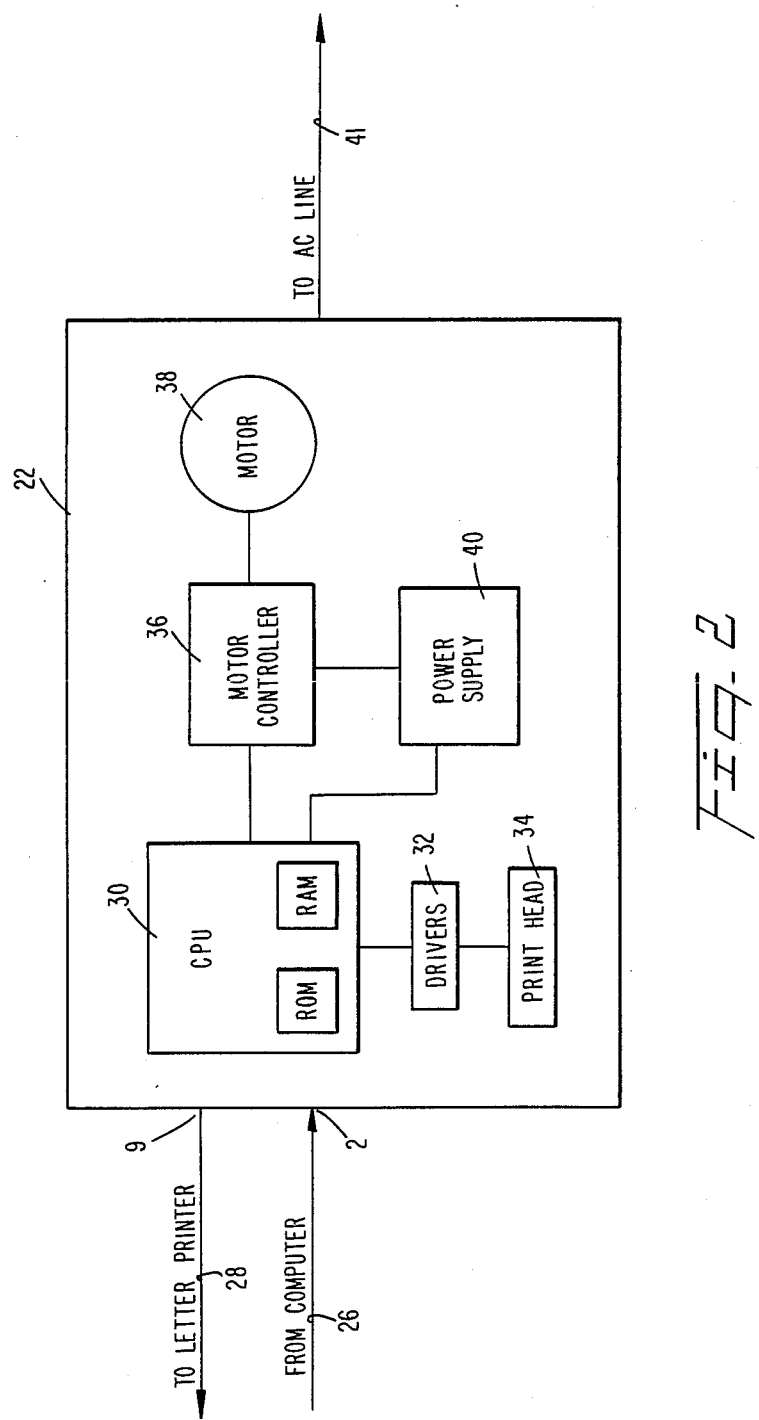

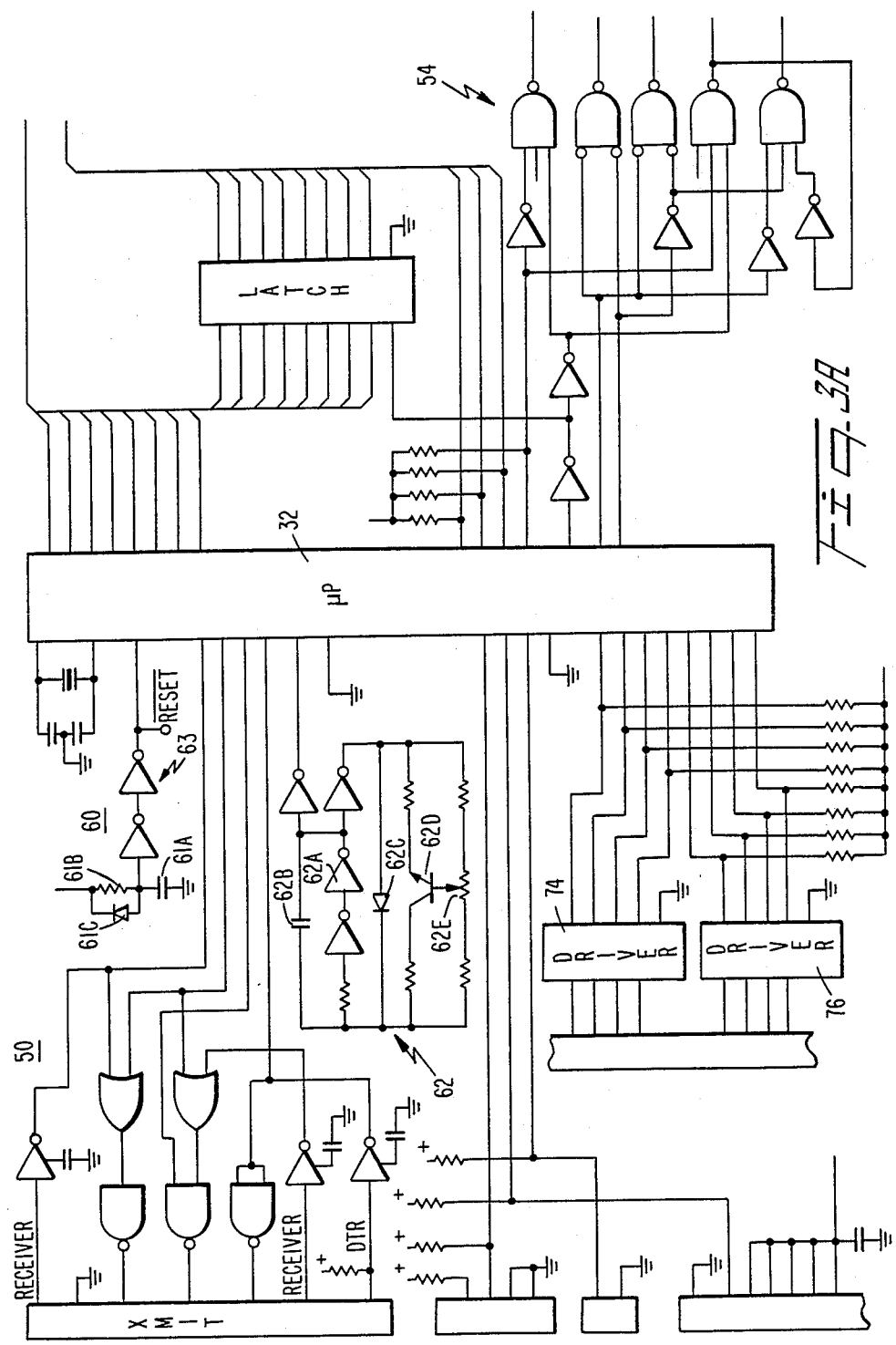

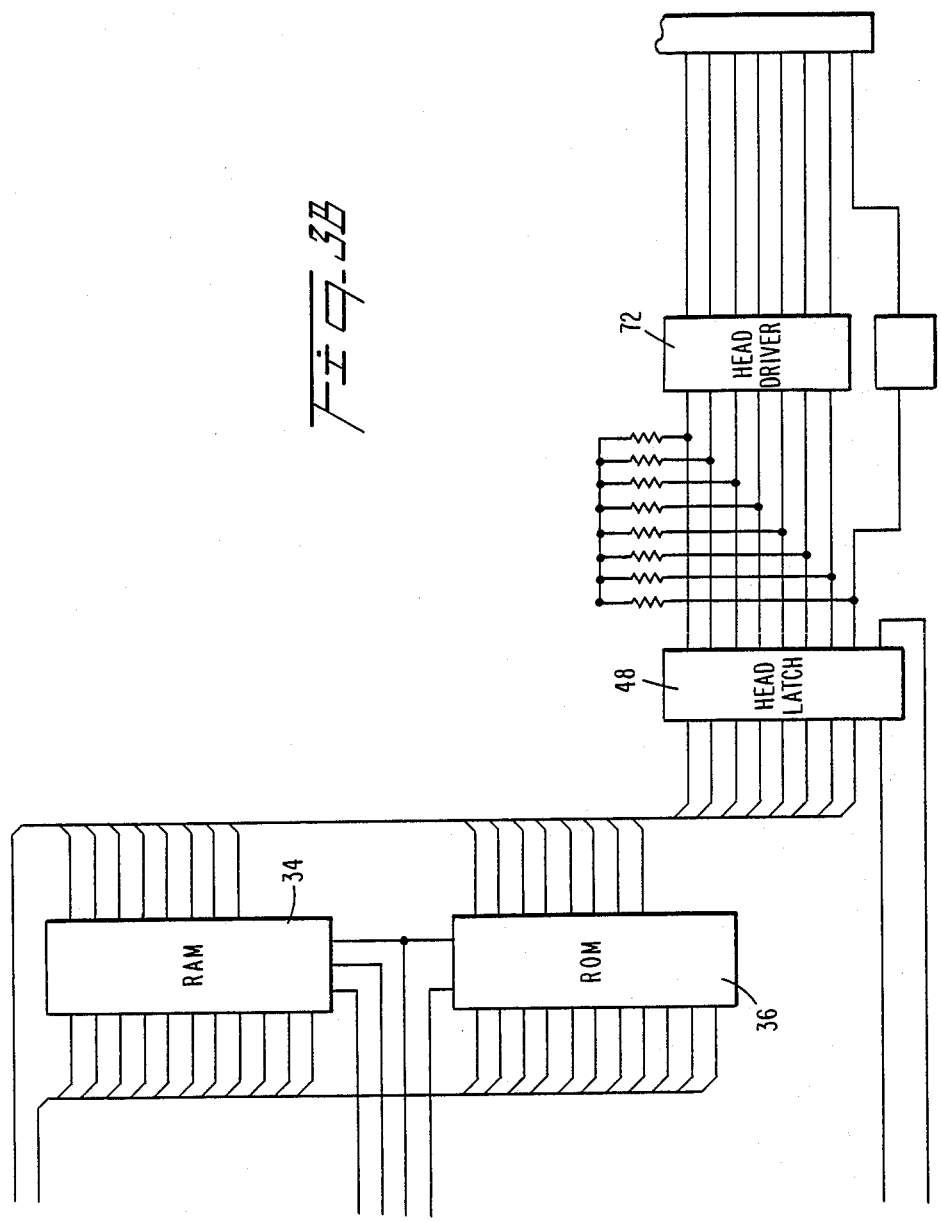

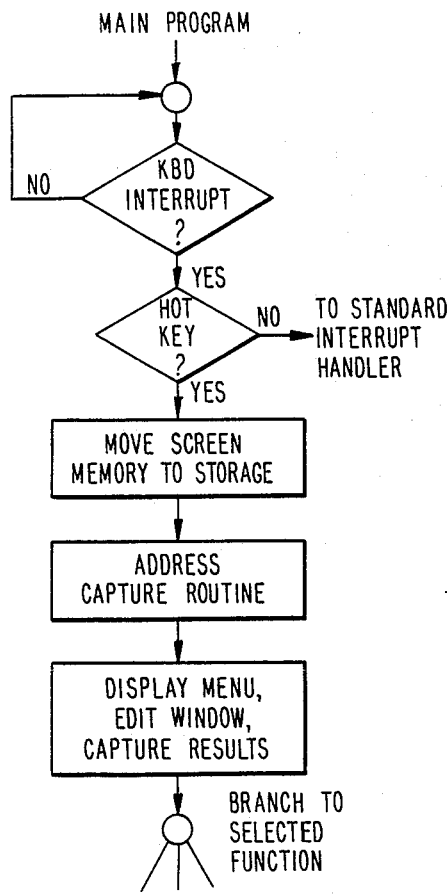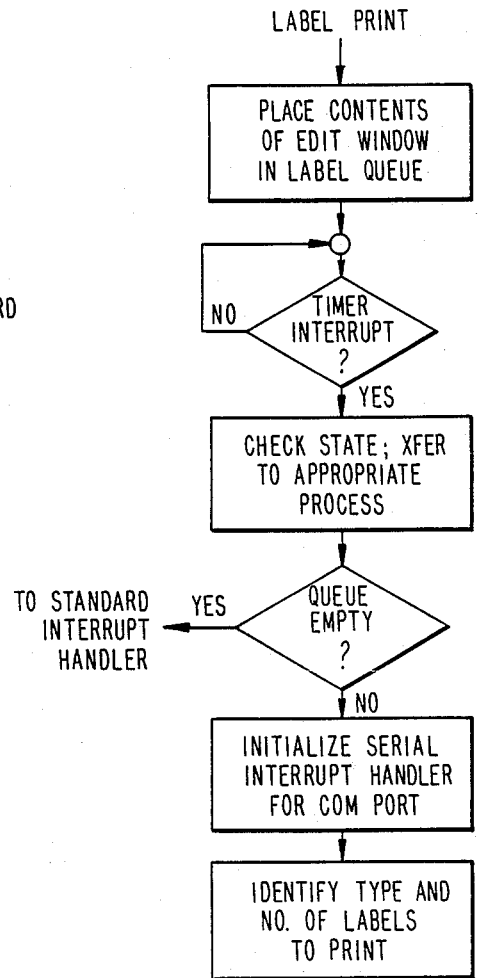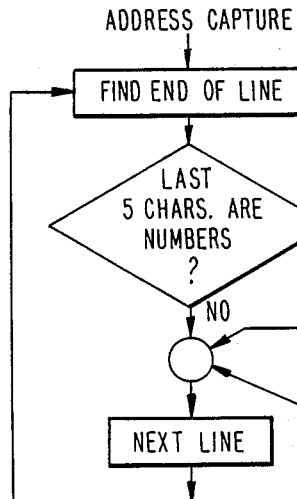

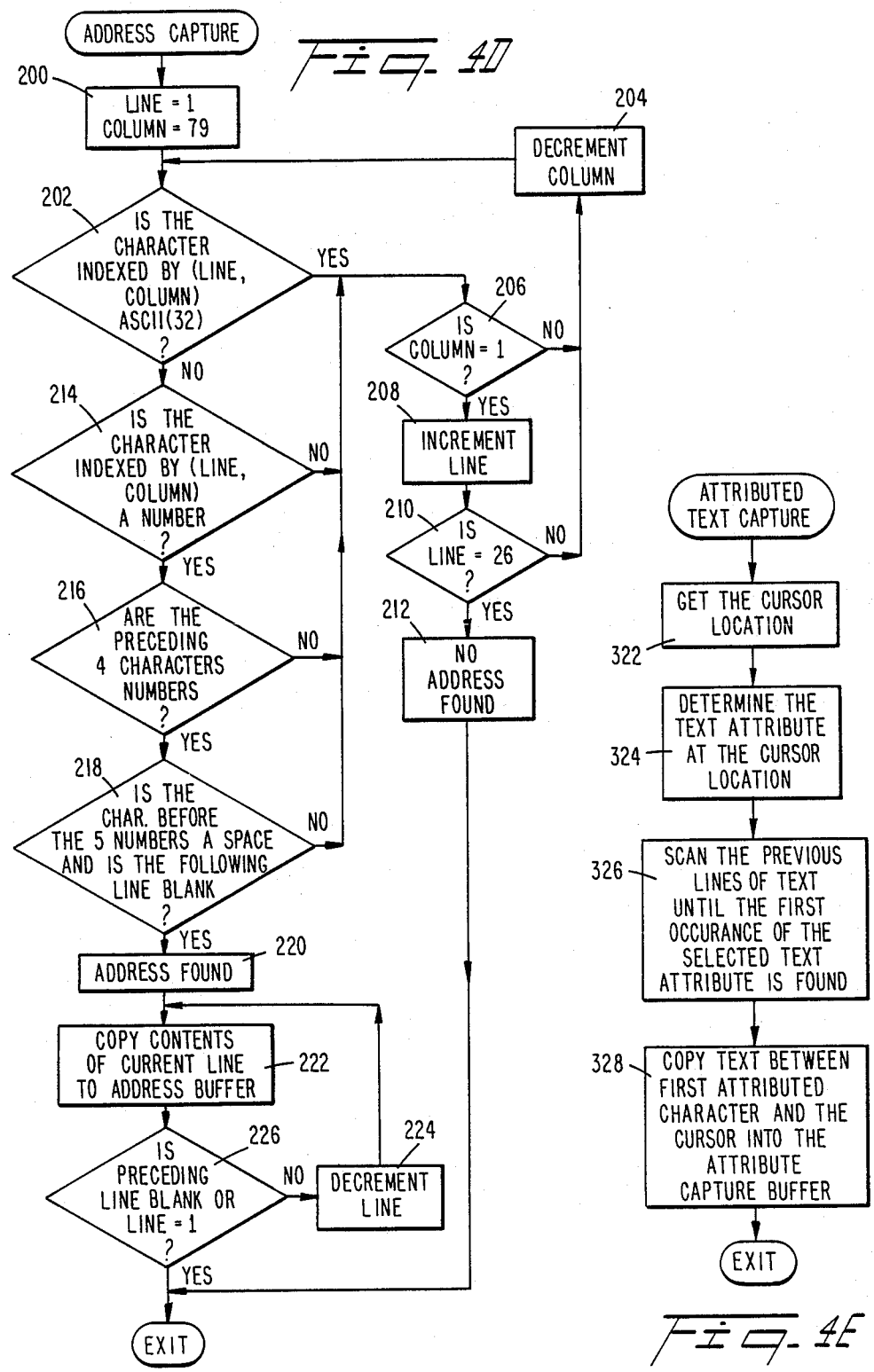

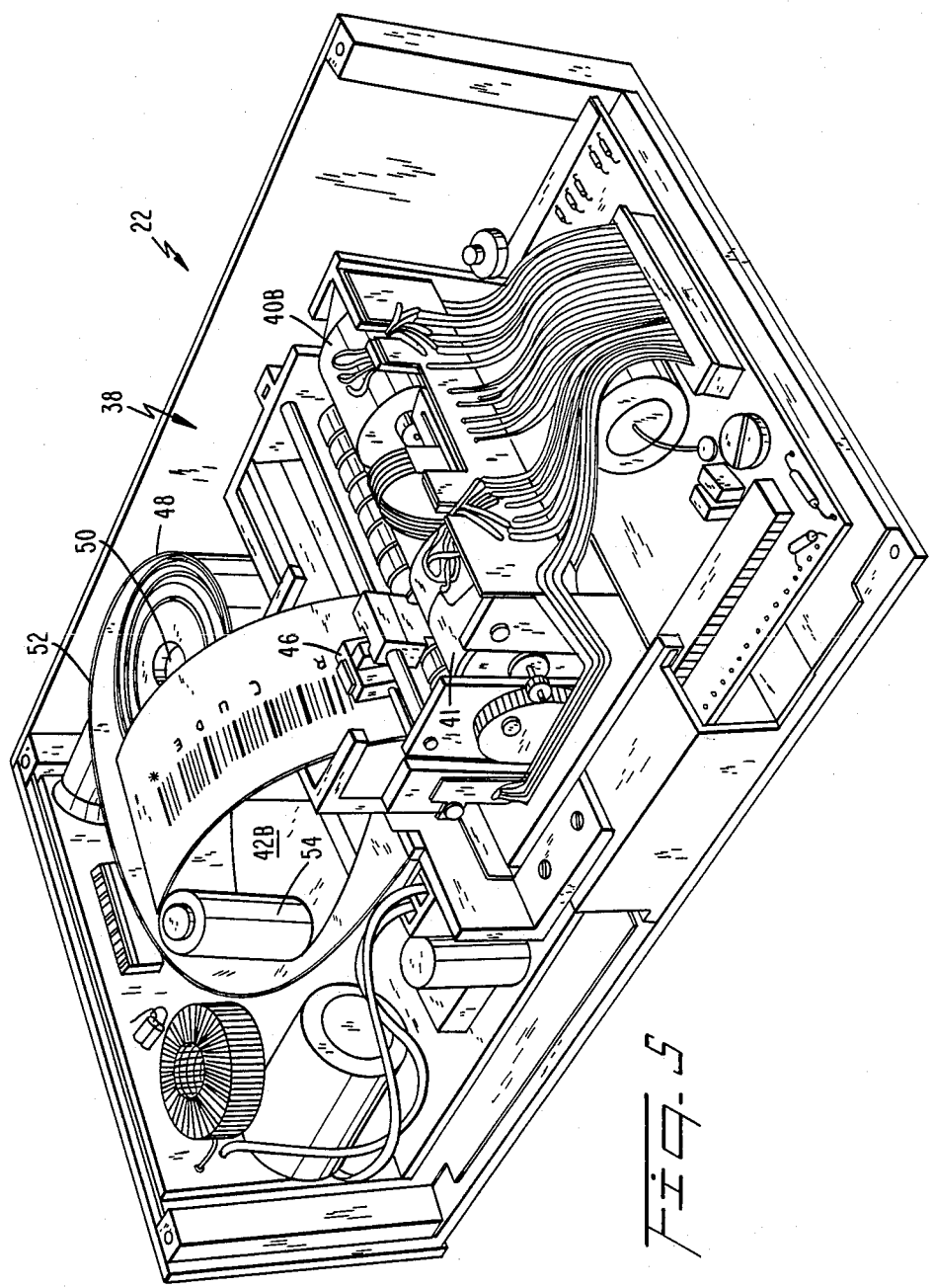

INSTANT LABEL PRINTER FOR HOST COMPUTER

The present invention has been the subject of Disclosure Document No. 140243 filed with the U.S. Patent and Trademark Office on Aug. 9, 1985.

TECHNICAL BACKGROUND

The present invention relates to computerized label printing, and particularly to apparatus for printing on a label of portions of a screen display generated by an application program running on a host computer.

Word processors and similar equipment utilizing personal computers are currently in widespread use. Most printing is done on pin feed forms, wherein perforations on the edges of the paper are engaged by sprocket wheels. When correspondence is printed using any of a number of different word processing programs, the envelope for the correspondence must be separately addressed by printing directly on the envelope or by printing a label and affixing the label to the envelope.

While many printers can print on an envelope, such printing is a complicated process. The pin feed paper must first be removed, an envelope is required to be inserted and software commands are needed to align the text correctly. After the envelope is printed, pin feed paper is reinserted into the printer. This process is time consuming and mistakes can easily occur including misalignment of text, transcription errors, and jamming of envelopes and pin feed paper. For this reason, it is a common practice to address the envelope manually with the aid of a typewriter or by pen and hand, practices antithetical to the use of efficient computers.

Alternatively, pin feed labels or pin feed envelopes may be used. However, although the labels and envelopes are fed automatically, the time needed to set up the forms and the necessary software commands to be implemented is so great that their use is justified only if many addresses need to be printed.

There is thus a need in the prior art for devices capable of efficient printing of labels without requiring expensive apparatus or time consuming setup procedures.

U.S. Pat. No. 4,569,610 to Drejza (marketed by IBM under the trade designation "Proprinter"), describes a machine capable of the simultaneous feeding of both primary and secondary documents while printing on only the secondary documents. In such a manner, a user is able to insert an envelope into a special slot without removing the pin feed paper. However, this printer cannot label any object thicker or larger than standard sized envelopes. Moreover, it is a full sized, medium priced, machine which is of little use to those who already own computer printers. Also, because the two documents must be simultaneously fed, a full page of paper is wasted each time a secondary document is printed.

Another approach to printing of addresses disclosed in "Simultaneous Document and Address Label Printing", IBM Technical Disclosure Bulletin, Vol. 28, No. 2, July 1985 uses a special carbon film coated label attached by a temporary adhesive to the rear of the pin feed paper in the area of the addressee heading. After printing a letter on the specialized paper, the label is removed and attached to an envelope. However, this system works only with impact printers, demands perfect alignment of the addressee heading and the label, and is restricted to printing only an exact duplicate of the letter heading. Moreover, labels with a temporary adhesive are likely to peel prematurely, causing paper jams in the printer.

U.S. Pat. No. 4,262,591 to Cook describes a dedicated label printing device which is a stand alone machine including its own computer with a keyboard, display and magnetic data storage mechanism. This device thus duplicates features found in personal computers, and, importantly, no means is provided to enable the device to be interfaced with a host computer running a variety of programs, each requiring a label to be printed.

There is accordingly a need in the prior art for devices capable of interacting with a host computer for printing a designated field from any portion of a document, without duplicating expensive components incorporated in the host computer.

Although certain word processing programs are marketed with features enabling selection of a specified field for printing on an envelope, for example, these features are limited to operation only with the particular word processor. Thus, if a portion of a spreadsheet or database from a different program is to be printed, or if a different word processor is loaded into the computer and it is necessary to print an envelope or label according to a selected address field or the like, the desired feature is lost and the previously described inefficient and complex approaches must be used. Such a system is marketed under the designation "Q & A", and was reported in the New York Times of Sunday, Mar. 9, 1986, at page 16F. As described therein, the program automatically abstracts an address field by finding the first line of text beginning in the left hand margin and not ending in two or more digits. All following flush left lines, until the first blank line, are considered to be the address field to be printed on the envelope. Apparently, however, the envelope must be inserted in the standard printer of the computer executing the program, thus interrupting the flow of program operation.

Significantly, none of these programs momentarily interrupt existing operating programs, pause the same, and provide an output for printing independently of the operating program, thereafter reinstating the program to its previous state by use of the DOS interrupt. These program or DOS interruptions can take place in a fraction of a second so that the user is not inconvenienced. None of the programs are provided for operation with any other program, such as a word processing program, and none of the prior art provide separate, resident, overlay programs which may be used for constantly monitoring the screen display to capture and output a particular field based on a predetermined criterion. Rather, they may be part of one particular operating program, are lost when the program is no longer running, and cannot be made to operate with other programs.

Accordingly, applicants have recognized a need in the prior art for implementation of a label printing feature which is not program dependent and which is operative for documents produced by application programs and which does not disrupt normal computer or printing operations.

In another consideration, the use of machine readable bar codes is a rapidly growing phenomenon at this time. While many small businesses are beginning to use bar code for inventory control, paper file labeling, product indexing, etc., the needs for the low volume or occasional bar code user can only partially be met. While bar code reading devices are becoming very small and inexpensive, for example the credit card sized "Videx Time Wand" made by Videx, Inc., of Corvallis, Oreg., bar code printers remain awkward or expensive.

Programs exist to allow certain dot matrix printers to print bar code, but the print is of low quality which can cause errors in machine reading, and, as in address printing, the time needed to convert an existing letter printer to bar code label printing prohibits the printing of anything but a large number of labels. Additionally, these machines have a needlessly large "footprint", i.e., too much table space is used thereby relative to the small size of the labels used.

U.S. Pat. No. 4,264,396 to Stewart describes a hand held bar code printer now being marketed by Monarch Marking as the "Pathfinder" which, while small and convenient, is quite expensive due to its many features such as a self-contained microprocessor, fixed print head with many drivers, liquid crystal display, battery powered operation, built-in keyboard, label stripper, and label mounting mechanism. While the marketed printer can be interfaced with a host computer, this machine is intended primarily as a self-contained labeling machine and duplicates many features already found in personal computers.

Other bar code printers described in U.S. Pat. Nos. 4,516,208 to Sakura et al; 4,422,376 to Teraoka, and 4,432,830 to Jue are large, mechanically complicated, and include microprocessors, label separators, keyboards, and memory storage means. Their high price of these devices essentially restricts them to applications where many labels need to be printed.

None of the known systems provide a bar code printer which, in response to a field captured by the program, translates the data in the field for printing as a bar code.

DISCLOSURE OF INVENTION

It is thus a primary object of the invention to provide a small, low cost label printing apparatus which interfaces with a host computer, and which, through the hardware and software thereof provides immediate and accurate printing without interrupting the normal functions of the host computer or existing printer.

It is another object of the invention to provide a printing apparatus for printing a portion of a display generated by a host computer, by interrogating the screen drivers of the host.

It is yet another object of the invention to provide an inexpensive, high resolution label printer controlled by a program which is resident in a host computer and which, in response to operator commands, interrogates the screen drivers of the host to print any field being displayed by the host.

It is an additional object of the invention to provide a printer and control program therefor, wherein the control program is resident in a host computer and permits substantially immediate access to any portion of a display generated by the host in accordance with any program executed thereby, for editing and printing.

It is an another object of the invention to provide a control program which determines a mailing address contained in a document displayed by a host computer, to allow the user to immediately print the mailing address on a label.

Yet another object of the invention is the provision of a printer and control program therefor, wherein the control program is resident in a host computer and permits substantially immediate access to any portion of a display generated by the host in accordance with any program executed thereby, for editing, conversion to bar code, and printing in any combination of alphanumeric, graphic, and bar code formats.

Still a further object is the provision of a bar code printer which captures data from a portion of an output display of a host computer and which, under program control, translates the same to bar code for printing on a label.

Another object of the invention is to provide a small, low cost printer capable of printing in various bar code symbologies, or any combination of text, graphics, and bar code.

It is another object of the invention to provide an interface between a host computer and a printer, either serial or parallel in type, which does not occupy the ports of a host computer to the exclusion of another device.

It is a more specific object to provide a label printer which can be simply connected to a port being used by another device, such as a modem, by a "Y" type connector, wherein the label printer is small and occupies little table space so that the printer can be conveniently placed next to the host computer or to an existing printer.

In accordance with the foregoing objects there is provided an apparatus comprising a print engine, a controller board, a power supply, an interface to a host computer and a software program. The program may be of a "terminate and stay resident" or "TSR" form (also called "RAM-resident"), which is loaded into the memory of the host computer and becomes memory resident. Alternatively, the program may be used with an operating system or "shell" that provides its own windowing so that the program can be loaded as an application program, rather than as RAM-resident. In the case of RAM-resident programming, when a user loads the program upon first turning on the host computer by, for example, including the program in a batch file, the program is always ready for instant access without a need to exit the application program. Accordingly, the apparatus is capable of functioning with almost any application program being executed by the host. Exceptions include programs which do not filter DOS interrupts.

While a user is operating an application program, the memory resident label making program may be called up. The program causes a "pop-up window" to appear, overlapped on the display of the application program. If a word processing program is displaying a correspondence letter with a mailing address appearing on the screen, the user can press a "hot key" on the host keyboard which, in accordance with the inventive program, has been predefined as an address capture key. The pop-up window appears with the address appearing in an editing area. Editing functions which also appear in the window allow the user selectively to modify the text. Activation of a print function of the program sends the data to the label printer and a label or labels a desired) is printed.

When printing is completed the labels are removed by the user. The pressure sensitive labels can then be manually peeled apart from their backing and applied to an envelope or other object. The backing material, which can be made slightly wider than the die-cut label material, allows for easy separation.

Significantly, all these operations may take place while a letter or other document is being printed by an existing printer in normal fashion. The system uses print buffers so that the host computer can resume operations while labels are being printed. The user can thus continue running his application program simultaneously with label printing.

The pop-up window can also be used to print any text directly entered into the window. For example, when an address is not contained in a document, the pop-up window appears blank. The user can now input an address to the window and immediately print a label, without having to exit from the application program being run on the host computer. In another example, a memo can be created while the user is running a spreadsheet. A hot key will bring up a blank window and any information entered into the window can then be printed.

Another feature of the program allows the user to print labels from "blocked" text. With a word processor, for example, text is highlighted or blocked in a normal fashion. When the user presses a predefined block capture hot key, the blocked text appears in the window for immediate label printing. This feature is particularly useful in printing address labels from documents with non-standard address fields, such as a Japanese address, that may not be automatically captured.

Another important use of this attribute is exemplified by the blocking of a part number and part description listed in an inventory control program. This information can then be captured and printed to label a product, package, part bin, etc. Significantly, the user can selectively print the output in the form of text and/or bar code of various symbologies.

The inventive apparatus can also print labels generated from mailing lists contained in word processing "mail merge", or mailing lists or other data from data base managing programs. In this mode, the program accesses the mailing list file previously stored on magnetic disk, for example, and by streaming the data through the pop-up window, allows for the printing of the entire mailing list. Additionally, a convenient "snap shot" function allows the user to print a label immediately after addition of a record into a database. This is useful for updating labels from a mailing list, or for keeping a manual address file, such as sold under the trade designation "Rolodex", current with a database, for example.

A graphics generating function allows the user to use the cursor keys of the host computer, a mouse, a digitizing tablet, or other input device to create graphic images. These images may be combined with text if desired. In this manner corporate logos might be combined with an address, distinctive borders can be drawn around text, etc.

Another feature of the invention permits frequently used text, bar codes, and graphics to be stored by the program in the storage facilities of the host computer, on magnetic disk for example, and to be retrieved when needed. The user can thus print his return address label, addresses of frequent correspondents, the bar code identification of a product, or a graphic image, simply by retrieving it from memory and pressing the print key.

As mentioned earlier with operating systems or "shells" that provide their own windowing, the program can be loaded as an application program, rather than as RAM-resident. In this case it can be called up through a window and can access other currently running application programs. The same tasks as described above would be performed by temporarily suspending the execution of the primary application program without the need to exit the primary application program.

In order to permit a large supply of labels within the printer, the die-cut labels may be positioned so that their longer dimension (length) is parallel to the web. Data is transferred to the print head for effectively printing in a sideways orientation. Also, structure may be provided in the printer to cause a continuous strip of labels to travel in a path and to be rotated by ninety degrees, making the machine even more compact.

Applications may include addressing of envelopes, catalogs, packages, etc., creation of memos, human and/or machine readable identification of inventoried items, products, part bins, file folders, packaged foods, prescription drugs, price tags, "Rolodex" cards, floppy disks, architectural drawings, etc.

Other objects, features and advantages of the present invention will become readily apparent to those skilled in the art from the following description wherein there is shown and described a preferred embodiment of the invention, simply by way of illustration and not of limitation of on of the best modes (and alternative embodiments) suited to carry out the invention. As will be realized upon examination of the specification and from practice of the same, the present invention is capable of still other, different, embodiments and its several details are capable of modifications in various obvious aspects, all without departing from the invention. Accordingly, the drawings and the descriptions provided herein are to be regarded as illustrative in nature and not as restrictive of the invention.

BRIEF DESCRIPTION OF THE DRAWINGS

FIG. 2 is a block diagram of the label printer, including control circuitry, shown in FIG. 1;

FIGS. 3A and 3B are schematic drawings of the controller board;

FIGS. 4A-4E are flow charts describing programming used in the invention; and

FIG. 5 is a perspective view of the label printer, with the label carrier twisted in accordance with an aspect of the invention.

DETAILED DESCRIPTION OF A PREFERRED EMBODIMENT OF THE INVENTION

Figure 1:
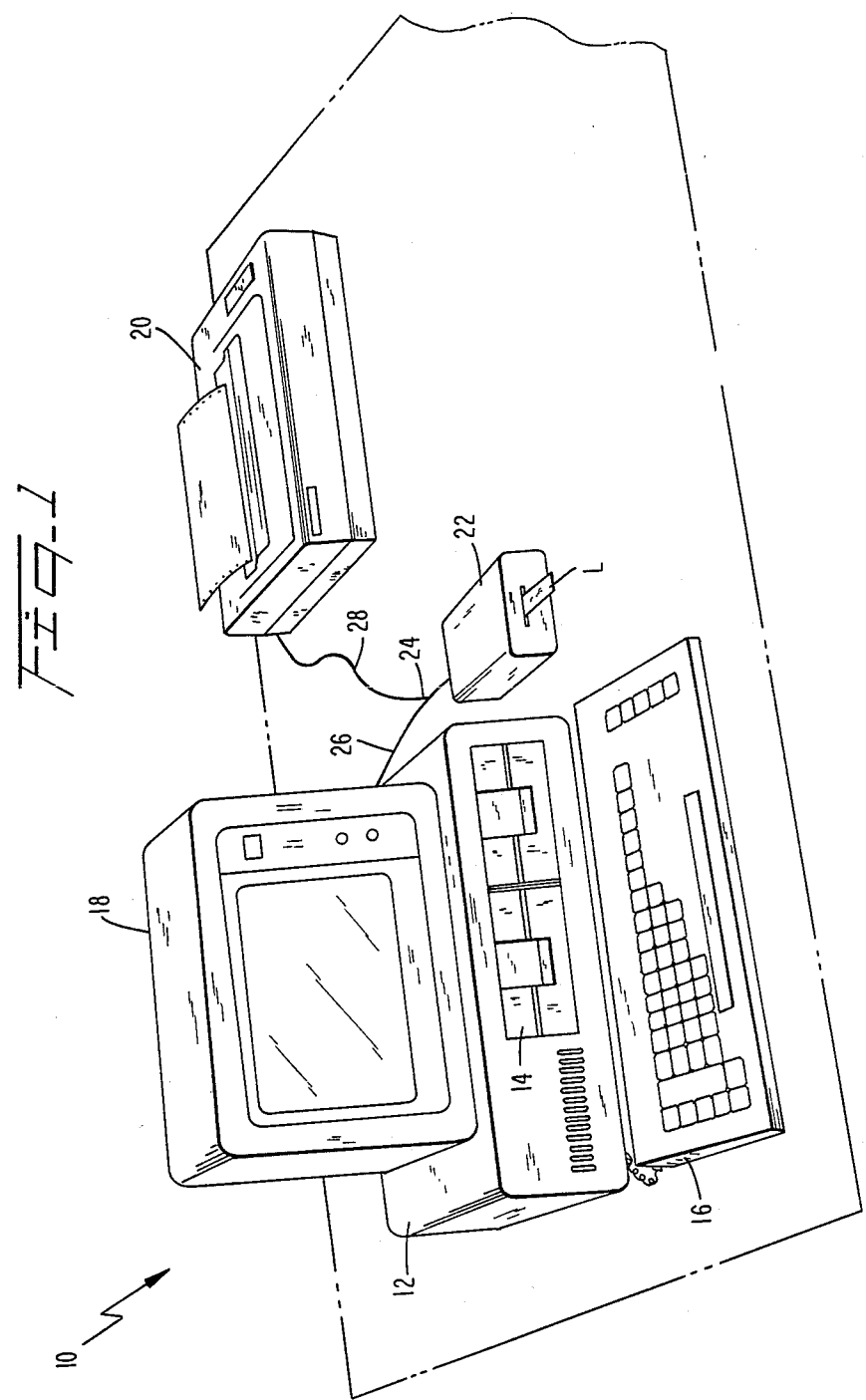
FIG. 1 is a perspective view of a computer work station using a label printer according to the invention.

Referring now to FIG. 1, there is shown a perspective view of the manner in which the present invention is used. More specifically, for a typical work station including a host personal computer 10, the computer circuitry is housed in a chassis 12 including disk drives 14. The station further includes a keyboard 16, a display 18 and a printer 20. The display 18 is driven by a conventional screen driver (not shown) which accepts data from a data source, such as the keyboard or a file, for temporary storage and formatting, to be applied to the display. The inventive arrangement provides a small label printer 22 connected to an output port of the computer an responsive to the screen driver to "capture" a portion of the data displayed on the screen, for printing on a label L, e.g., an address label for mailing as shown in FIG. 1.

Preferably, the printer 22 is sufficiently small, (e.g., 2"×4"×5") to minimize space requirements at the work station. For quick and silent operation, the printer 22 is preferably a non-impact printer, and for flexibility of operation and simplicity of control at reduced cost, a moving serial print head printer may be used, including a stepper motor for moving labels and a separate stepper motor for the print head. This feature permits increased resolution printing, dot overlap, bidirectional printing, and the like.

Printer 22 is connected to the host computer by a Y-connection, symbolically illustrated by the cable arrangement shown at 24. This arrangement connects the printer 22 in series between the host computer and the existing printer. For example, in the illustrated Y-connection a parallel (or serial) cable 26 originally connecting the computer to the printer 20 is now connected to printer 22 and another cable 28 is connected between printers 22 and 20.

Thus, the program controlling operation of the invention permits connection of the label printer 22 to the computer without displacing any other equipment and without tying up any of the computer ports.

FIG. 2 shows in block diagram form, one arrangement for printer 22, wherein a controller 30 incorporates a microprocessor based CPU 32 and appropriately sized memories RAM 34 and ROM (EPROM) 36 to provide appropriate control signals to a print engine 38 such as a type STP211-144 manufactured by Seiko Instruments & Electronics LTD., Tokyo, Japan. A separate motor driver 40A drives a paper feeding motor 40B within the engine 38, and a power supply 42, connected to a source of AC, provides appropriate power to the components of the printer. As previously mentioned, the controller 30 may operate the print head motor 41 and control the print head 40 via driver 40C to provide a high resolution output. The printer 22 is connected to host computer 10 via an interface 50, which may be serial (e.g. RS-232) or parallel (e.g. "Centronics"). A serial RS-232 interface is illustratively shown in FIG. 2.

The label printer 22, which contains the print engine 38, has room for a roll of labels 44, includes the controller board 30 and the power supply 42 as shown in FIG. 4. Preferably, the label stock is a roll of die cut labels, backed with pressure sensitive material and coated with thermal sensitive material to provide non-impact thermal printing. Of course, other forms of non-impact may also be used, such as ink-jet, thermal transfer, or laser printing. Although impact printing may be utilized, the above described preferred embodiment provides a simple, quick, inexpensive, compact, and quiet printer.

With reference to FIG. 5, the preferred print engine 38 has a moving thermal print head 46. Because only a small number of resistive elements in the thermal head need be addressed at any one time, electronics is kept simple and inexpensive. Due to the two motor design, i.e., separate head and paper drive motors 40B, 41, much accuracy can be achieved in the head 46 for paper positioning, enabling printing of high quality bit-mapped graphics as well as "letter quality" text.

It will be recognized that many other types of print engines could readily be employed. Single motor serial thermal printers or the printer described in U.S. Pat. No. 4,379,646 to Maeda have the advantage of very low cost but offer less printing accuracy. Parallel (fixed head) thermal printers, such as that described in U.S. Pat. No. 4,088,214 to Shindo et al, are more expensive but offer higher printing speed. If plain paper is desired for label stock, a thermal transfer (using a ribbon) type of print engine, as well as ink jet, could be used. All these devices are quiet and compact.

Impact printers, for example, a solenoid driven pin dot matrix printer, as well as formed character print mechanisms, such as commonly available letter-quality, daisy wheel printers, could be used, with the limitation that only alphanumerics, not bar codes or bit-mapped graphics, are to be printed.

To reduce the overall size of the printer, it is contemplated that the roll of die-cut labels be placed at a 90 degree angle to the print direction of the print head as shown at 42B in FIG. 5. Thus, the longitudinal axis of a spindle supporting the roll of labels is parallel to the lateral direction of the labels when being printed.

By way of explanation, it is particularly contemplated that one size of the labels may be approximately $\frac{1}{2}$ to $2\frac{1}{2}$ inches in height and approximately 3 to 4 inches in length. Thus, addresses of five or more lines and having 30 or more characters may be printed thereon. It is contemplated that the labels be adhesively bonded, via a release layer, to a strip of paper wound on a spindle 50 as shown in FIG. 5. The strip of paper would be thus approximately $\frac{1}{2}$ to $2\frac{1}{2}$ inches in width, and the labels are, effectively, laterally mounted adjacent each other.

Since the paper feed mechanism propels the strip in its longitudinal direction past the print head, and thus propels the labels in the lateral direction past the print head, the present controller is programmed to cause the print head to print in a sideways orientation in any known manner, thus providing the proper orientation of the printed characters on the labels. Such a paper feeding arrangement, however, typically provides placement of the roll so that the axis of the mandrel is along the height dimension of the labels being printed. However, by placing the roll so that the mandrel axis is parallel to the direction of advancement of the labels at the print head, considerable space is saved. Accordingly, in the present invention the spool of die-cut labels is placed with the mandrel axis parallel to the advancement direction of the labels at the print station, so that a roller is provided at an approximately 65 degree inclination to bend the unfolding strip and to change the direction of advancement of the labels by 90 degrees.

Thus, still referring to FIG. 5, label supply roll 48 is mounted on the vertical spindle 50 so that label carrier 52 extends outward from the roll in a vertical plane to be guided by capstan 54 into a ninety degree twist, for ingress to print head 46. This enables the printer 22 to be much more compact and accordingly have a substantially smaller "footprint" than otherwise would be possible without the twisted label carrier flow path as provided herein. With such an arrangement a roll containing 150 labels of $1'' \times 3\frac{1}{4}''$ dimensions, for example, can be contained in a printer housing which can otherwise only accommodate a very small number of labels.

Although not shown in FIG. 5, it will be recognized that a label stripper or backing separator may easily be incorporated in the printer if single label dispensing is desired. Conversely, if many labels are to be printed and later separated, a motor driven take-up spool may be used to wind the outputted printed labels.

Preferably, although not shown, a current sensing circuit is used to shut off the motors in case of a paper jam. Similarly, the end of a label roll may be sensed when the last label is taped to the roll core.

For the die-cut label strip printer, it is contemplated that a photocell or similar sensing mechanism (not shown) be used to detect spaces between consecutive labels, thus enabling simple and accurate positioning of the labels for printing. The microprocessor 32 of the controller 30, in response to the photocell, provides appropriate control signals to the motor drivers for both the print head and the paper feeding mechanism, thus providing the proper positioning for the labels.

Returning to FIG. 2, controller 30, which includes interface 50 for communication with the host computer 10, communicates with the print engine 38 by way of sensors and switches 52 and drivers 40. The sensors and switches designation refers to three input lines to the CPU 32 that are used to detect carriage home, line feed, and perforation or paper detection. For the case of the perforation sensor line, a variable resistor (not shown) is preferably incorporated for biasing of sensor current and thereby varying the threshold sensitivity of the sensor.

FIGS. 3A and 3B show additional details of the controller 30 as well as the manner of connection to the host computer 10. The various components of the actual printing mechanism are grouped together, for illustrative purposes, within the block 38 labelled Print Engine in FIG. 2, including appropriate stepper motors, print head, etc. The microprocessor 32 used in the presently preferred design is a Zilog Z8681 processor, which includes two timers, a serial interface, and several port lines. One of the timers serves as a baud rate generator, while the other serves as a motor pulse timer. As will be more clearly understood from the following specification, the port lines are used for the motor control lines, for serial interface, and for switch detection.

Upon receiving signals from various sensors and limit switches in the print engine 38, the microprocessor 32 provides appropriate signals to the motor drivers 40 as well as to the print head 46, for moving the print head and the label and for activating the print head in accordance with the dot information in a head dot latch 48. Latch 48 receives the dot identifying information, for identifying the particular resistances to be activated in the print head. This port of the microprocessor is addressed to respond to a write to ROM addresses. A reset condition resets the outputs of the head latch 48 to low values, so that the head will not turn on upon power up.

The ROM 36 used in the present design is preferably a 2716 EPROM, although other compatible ROM devices may be used. The RAM 34 used in the design is a 6116 type, or equivalent, 2K×8 RAM.

Decode and buffer circuitry 54 accesses control data from ROM 36 and provides the data to RAM 34 as well as to address/data separator 56. The decoding section of the controller derives valid read and write times from the processor lines and also generates enable signals for the ROM and RAM, as well as for the head port. The ROM 36 is addressed in the top half of the 4K range, and the RAM 34 is in the low half of the 4K range. The head port responds to a write to ROM command.

Although the microprocessor 32 has a total addressing range of 128 K, the full range is not utilized herein. Thus, the address lines are arranged to use only a 4 K address range. Sufficient space is left to implement any necessary changes in storage addressing that may arise. By limiting the space required to be left it may be possible to replace the processor by a programmed ROM, and thus to eliminate the external ROM 36, providing a significant cost saving.

Separator 56 has direct access to ROM 36 and communicates with RAM 34. The separator 56 is a single 8-bit latch, controlled by the address strobe line of the microprocessor 32, and functions to de-multiplex the address/data bus for the lower 8 address lines.

A reset circuit 60 is provided for resetting the microprocessor 32 and the head dot latch 48, to reinitiate operations and further to clear the latch. The reset circuit is used to reset the printer in response to toggling of a power switch (not shown).

A voltage/temperature compensated oscillator 62 provides a signal at a particular frequency for turning on and off the dot elements of the print head. The oscillator signal frequency, though unstable with respect to temperature and voltage, is described by a predictable instability. As temperature increases, the frequency becomes higher, thus causing the dot elements of the print head to be left ON for a shorter time period. A similar effect is produced upon an increase in voltage. The inverse effect is experienced for reductions in temperature or voltage. The oscillator is compensated in order to provide consistent dot densities under varying operating conditions.

A more detailed description of the components assembled on the controller board 30 shall now be given with reference to FIGS. 3A and 3B, wherein the actual interconnections among the various chips and circuit components are shown. The Z6881 processor 32 is connected through its input and output ports to the other portions of the controller. As further noted in FIG. 3B, the head driver utilizes a ULN2003A chip 72, while two additional such chips 74 and 76 are shown in FIG. 3A for the paper motor drivers and carriage motor.

Head latch 48 in FIG. 3B is formed of a single 74LS273 resettable 8-bit latch. This output port of the latch 38 is addressed to respond to a write to ROM addresses. Decode and signal buffer section 54 is made up of a 74LS10, two sections of a 74LS32 chip, and a 74LS04. This section derives valid read and write times from the processor lines and also generates enables for the ROM, RAM and head port.

The reset circuit 60 is comprised of two sections of a 4069 invertor 63, a 1N914 switching diode 61C, and a series RC circuit 61B, 61A. The capacitor 61A is slowly charged with a 5 volt potential through resistor 61B. Invertors 63 buffer the input to the processor 32 and also to the head dot latch 48, while diode 61C discharges only the capacitor 61A when the microprocessor 32 is powered down.

The RS232 50 is comprised of a 1488 and 1489 RS232 transmitter and receiver. This circuitry is in one of two possible states, active or pass through. In the active state, the processor port line is at a logic high level, causing the outputs of the LS32 sections to remain high regardless of the signal applied to the other input. Thus, data transferred from the host to the device on the serial line is blocked. Data is received by the microprocessor 32 in this mode via one processor line and is transmitted from the microprocessor to the host via another processor line. The DTR line is the device by which the host selects the active mode.

The voltage/temperature compensated oscillator 62 is comprised of four sections of the 4069 inverter 62A, a capacitor 62B, a 1N914 diode 62C, a 2N3904 transistor 62D, a trim resistor 62E and a number of bias resistors, used to adjust the oscillator frequency.

As has been hereinabove described, the present invention includes hardware circuitry for controlling the printer, as well as a program for the host processor. Programming in accordance with a preferred embodiment of the invention is now described within the environment of a TSR (RAM-resident program) which is loaded by a user or by a batch file. This program, which is an alternative to multi-tasking, replaces the standard interrupt handler of the host personal computer, screens and filters all keyboard and timing interrupts as described below.

As an overview, upon activation of the appropriate "hot keys", the resident program takes over control of the host. In operation, a menu is displayed to enable the user to choose among a set of options. In one mode of operation (address mode), the program executes an address capture routine and searches for an address on the document being printed. Upon finding an address field, the address within the field is displayed in a "window" of the host display screen, permitting the user an opportunity to edit the address. In another mode of operation (attribute mode), the user may highlight a portion of the host display. The program extracts the highlighted portion and displays the same in the window, for editing by the user. In a third mode of operation, the user may manually input information from the keyboard to the window generated by the program. In all three cases, the user is given an option of causing the information in the window to be edited, printed, saved, translated to bar code, and printed as bar code together with human readable alphanumeric characters. Upon response of the user to the menu request, the program performs the necessary function, and returns control of the host to the operating program then being executed. By providing a buffer in the computer, quick return to the operating program is assured after the interrupt.

Thus, the present invention permits labels to be printed by momentarily interrupting a program running on a host computer, by highlighting a specific field of a display, by keyboard input or by automatic address capture. The program permits a user to input a particular character string for translation to bar code or permits automatic selection of a portion of the display and automatic translation to bar code.

In a further feature of the invention is the provision of a "rubber stamp" mode of operation, wherein a number of character strings are stored for printing on labels to be applied to letters, envelopes, packages, etc. Label strings such as "FRAGILE", "AIR MAIL" and the like, may thus be stored. By selection of the appropriate "rubber stamp" mode of operation, a user may cause the various stored strings to be displayed for selection and printing. Since the size of the printed characters may be set by the user, the printed rubber stamp labels are produced in a larger scale than the address labels generated for use with correspondence.

Specific programming for carrying out the address and attribute capture modes of operation for label printing shall now be described in detail with reference to FIGS. 4A–4E. In FIG. 4A, the program is initiated at START block 100 with the user installing the program manually or via a batch file, and then powering up the printer 22 (step 102). The current keyboard interrupt vector 09 (hex) is replaced with the vector to the addressor keyboard interrupt handler, and the original vector is moved to vector 69 (hex), in step 104. In step 106, the current timer interrupt vector 1C (hex) is replaced with the vector to the addressor timer interrupt handler, and the original vector is moved to vector 69 (hex). The program now remains resident in memory (step 108), and the user now installs his application program, such as a word processing program (110).

When the user presses a key (step 112), an addressor interrupt routine is called at 114 and, still referring to FIG. 4A, the original keyboard interrupt is executed by calling the routine at vector 69 (hex) at step 116. If the key depressed is not an addressor hot key (step 118), the program returns to the application program at step 110; otherwise, if the key depressed is a hot key, the original keyboard interrupt vector is restored (step 120) to avoid nested interrupts.

If the hot key depressed is determined in step 122 to be the address capture key, rather than the attribute capture key, the screen memory is searched for an address (step 124) using the address capture routine shown in FIG. 4D. Any address so located is saved, in step 126, and an addressor menu and edit window are displayed on the screen ("pop-up" window), in step 128.

If the hot key depressed is determined in step 134 to be the attribute capture key, the screen memory is searched in step 136 for the attribute called by the routine shown in FIG. 4E. Thereafter, the original keyboard interrupt vector is restored (step 138).

If any data, i.e., an address or attribute, was captured, as determined in step 130, it is displayed on the screen (step 132), and the program continues to the menu routine shown in FIG. 4B. The menu routine determines in step 300 whether the user has typed a key to call for any of the following functions: edit address; address memory; print address; bar code; rubber stamp; special functions; and escape. Particular routines (not shown) carry out the function selected during step 302. If the "edit address" function is selected, the user is allowed to edit the address window, in step 304. The "address memory" function, in step 306, displays the address memory menu, and the "print address" function in step 308 places the address captured into the print queue. The "bar code" function displays the bar code menu (step 310), the "rubber stamp" function displays the rubber stamp menu (step 312), and "special functions" displays the special functions menu (step 314). If "escape" is selected (step 316), still referring to FIG. 4B, the original screen image is restored (step 318), and in step 320, the current keyboard interrupt vector is replaced with the vector to the addressor interrupt handler, and the original interrupt handler is moved to vector 69 (hex). The program now returns to the application program at step 110.

Referring now to FIG. 4C, printer control is initiated by an addressor timer interrupt routine at step 140 which executes "in the background" of the main application program and wherein, each time a timer interrupt occurs (every 55 milliseconds), at step 142, the addressor state processor 144 is called. The address state processor at 146, with its state initially reset (state=0) at step 148, determines whether the label queue is empty, i.e., whether there are labels available in the label queue (Step 150). If the label queue is empty, the program returns from the addressor timer interrupt routine to the main application until, upon the occurrence of the next addressor timer interrupt, the addressor state processor is again called. This process repeats until the label queue is no longer empty. If the label queue is not empty, the state is incremented (step 152) and the program returns to the main application program.

Since the state is now 1, upon the next call of the addressor state processor 146, the program passes through step 148 to step 154 where it is determined whether the state is equal to 1. Since the state is now equal to 1, the default COM port of the microprocessor 32 is initialized (step 156), and the state is again incremented by step 152. The program now returns to the main application program and, upon the next call of the addressor state processor, passes through step 154 to step 158 where it is determined that the state is equal to 2. The microprocessor 32 is placed into a wait state for one second to enable the printer 22 to restore (step 160).

During the next pass, with the state again incremented, step 162 determines that the state is equal to 3 and in response obtains the current status of the printer in step 164 to determine whether the printer is ready to print a character. The state is again incremented (step 152).

In state 4, determined during step 166, the next label from the queue is read in step 168 to determine whether the type of label to be printed is an address label, a bar code label or a label to receive a "rubber stamp". If the label is determined to be an address label, it is assigned a state 100; if it is determined to be a bar code label, it is assigned a state 200; and if the label is determined to be a "rubber stamp" label, it is assigned a state 300 (step 170).

During subsequent passes of the addressor state processor routine, an address print routine is executed (step 172) if the state is determined in step 174 to be between 100 and 199; a bar code print routine is executed (step 176) if the state in step 178 is determined to be between 200 and 299; and a "rubber stamp" routine is executed (step 180) if the state in step 180 is determined to be between 300 and 399. Following the last print routine, the state is set to 900 to be detected during step 192. If there are no more labels to print (step 194), the printing routine is "shut down", in step 196, i.e., the COM port is restored and print and queue pointers are reset.

The following description identifies a method used by the RAM-resident program of the present invention to locate addresses on correspondence letters.

The screen memory is loaded into a temporary memory location. Scanning of the screen data takes place beginning at the first memory location and continues until the end of line is found. Scanning then goes backward. If the first character at the end of line is not a number it is skipped and scanning takes place at the end of the next line. If the character at the end of a line is a number, the next character is scanned. If it is also a number, the next character is checked and so on until at least five consecutive numbers are found. If the next character scanned is a space, it is assumed that the string of numbers is a zip code (in this manner, extended zip codes could also be searched). If the next line scanned is blank, the preceding six lines are scanned. If the first character of the first of these lines is more than ten spaces indented (for example), it is assumed it is a return address. If not, the lines are moved into the address buffer.

This technique is shown in detail in the flow chart of FIG. 4D, wherein step 200 "points" initially to line 1 in column 79 of the screen, i.e., the upper right-hand corner of the screen to determine whether there is character having an ASCII value less than 32, i.e., a non-printable character in step 202. If so, and the current column is not the first the column of the screen (step 204), the pointer is decremented by one column to the left (step 206) to interrogate the next character. If the current column is not the first column on the screen, as determined in step 202, the line pointer is incremented in step 208, and assuming that the current line is not 26, i.e., at the bottom of the screen as determined in step 210, the column pointer is decremented in step 204, and the search for a printable character continues. If, when the current line pointer is at 26 as determined during step 210, no printable character has been located, and accordingly no address is deemed to be on the screen (step 212), the program exits to step 318 in FIG. 4B.

If, in step 202 a printable character is located, step 214 determines whether the printable character is a number. If the character is not a number, the character is ignored as the program returns to step 202. If the character is a number, on the other hand, the data is considered to possibly be an address, and the program continues to step 216 where it is determined whether the preceding four characters are numbers. If the character is not a number, the string of numbers is determined to not be a zip code, the data accordingly is deemed to not be an address, and the program continues to step 202. If the preceding four characters are numbers, however, step 218 determines whether the character before the five numbers is a space, and the following line is a blank, characteristic of an address. If so, the address is confirmed (step 220) and saved by copying the contents of the current line to an address buffer (step 222) and decrementing (step 224) until the preceding line is determined to be blank or is the first line on the screen (step 226), indicating that the complete address has been stored. The program now exits at step 318 at FIG. 4B and proceeds to control printing of the address on a label using conventional "sideways" conversion software.

To capture attributed text, the program in FIG. 4E determines the cursor location (step 322), the text attribute at the cursor location is determined (step 324) and the previous lines of text are scanned until the first occurrence of the selected text attribute is located (step 326). Step 328 copies text between the first attributed character and the cursor into the attribute capture buffer for subsequent printout through the "sideways" conversion software.

The foregoing description of the preferred embodiment of the invention has been presented for purposes of illustration and description and is not intended to be exhaustive or to limit the invention to the precise forms disclosed, since many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitably entitled. For example, as previously mentioned, although the program has been described as RAM-resident, it is to be understood that the program could be executed within the environment of operating systems or "shells" that provide their own windowing, whereby the program can be loaded as an application program, rather than a RAM-resident program to be called up through a window concurrently with other executing application programs operating in other windows.

We claim:

1. a label printing system for interfacing with a host computer, said host computer executing application programs, such as a word processing program, and including a keyboard, a display screen and screen driver means for driving said display screen, said label printing system comprising:

label printer means for recording data on a label;

printer control means providing control signals to drive said label printer means;

interface means for interfacing said label printer control means to said host computer; and a control program executable by said host computer and independent of said application program for (a) interrogating said screen driver means for data displayed on said display screen in response to the application program executed by said host computer;

(b) importing to said control program a portion of said displayed data to be printed on said label; and (c) supplying the imported data portion to said printer control means.

2. A label printer apparatus as recited in claim 1, wherein said control program executed by said host computer is responsive to keyboard inputs for selectively (1) accepting the imported data for display by said host computer, (2) editing the imported data, (3) storing the imported data and (4) transmitting the imported data to said printer control means for printing by said label printer means.

3. A label printer apparatus as recited in claim 1, including a RAM-resident program in said host computer interfacing said printer control means and enabled by an activation of a "hot key" of said keyboard.

4. A label printer apparatus as recited in claim 3, wherein said host computer includes means for filtering keyboard inputs to said host computer to detect whether the hot key of said RAM-resident program has been activated.

5. A label printer apparatus as recited in claim 4, wherein said RAM-resident program in said host computer comprises means for generating a pop-up window in response to detection of an activation of said hot key and means for accepting keyboard inputs for, selectively, (1) displaying the imported data in said window, (2) editing the imported data, (3) storing the imported data and (4) transmitting the imported data to said printer control means for printing by said label printer means.

6. A label printer apparatus as recited in claim 1, wherein said control program includes means for determining an address portion of text displayed by the screen of said host computer, storing said address portion, and transferring said address portion to said printer control means.

7. A label printer apparatus as recited in claim 1, wherein said control program further includes means for formatting, as alphanumeric characters corresponding to input keystrokes provided by a user to said keyboard, the imported data to be supplied to said printer control means.

8. A label printer apparatus as recited in claim 1, wherein said control program further includes translating means for automatically translating the imported data to a bar code format for transfer to said printer control means;

said control program comprising bit mapped graphics means for causing said printer to print the imported data in said bar code format.

9. A label printer apparatus as recited in claim 1, wherein said host computer includes an input/output port, and said interface means interfaces said printer control with said host computer via said input/output port, means for connecting another peripheral device to said input/output port, and means communicating with said control program for passing the imported data selectively to either one of said printer control means and said peripheral device.

10. A label printer apparatus as recited in claim 1, wherein said printer means comprises die-cut label strip storage means for storing a series of labels, said label strip storage means comprising first means for causing a label strip stored in said storage means to change a direction of travel of said strip by 90 degrees and second means for causing said printer means to print characters at a 90 degree rotation, thereby providing storage capability for an increased number of labels on said label strip storage means.

* * * * *